(12) United States Patent
Hozumi et al.

(10) Patent No.: US 9,815,386 B2
(45) Date of Patent: Nov. 14, 2017

(54) VEHICLE SEAT (71) Applicant: AISIN SEIKI KABUSHIKI KAISHA, Kariya-shi (JP)

(72) Inventors: Soichiro Hozumi, Kariya (JP); Toshiro Maeda, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/022,756

(22) PCT Filed: Mar. 25, 2014

(86) PCT No.: PCT/JP2014/001695
§ 371 (c)(1),
(2) Date: Mar. 17, 2016

(87) PCT Pub. No.: WO2015/040771
PCT Pub. Date: Mar. 26, 2015

(65) Prior Publication Data
US 2016/0229313 A1 Aug. 11, 2016

(30) Foreign Application Priority Data
Sep. 19, 2013 (JP) ................. 2013-193944

(51) Int. Cl.
*B60N 2/20* (2006.01)
*B60N 2/23* (2006.01)
(Continued)

(52) U.S. Cl.
CPC ......... *B60N 2/0232* (2013.01); *B60N 2/0224* (2013.01); *B60N 2/0252* (2013.01);
(Continued)

(58) Field of Classification Search
CPC .. B60N 2/0224; B60N 2/0252; B60N 2/0232; B60N 2/20; B60N 2/06; B60N 2/12; B60N 2/4492; B60N 2/4495
(Continued)

(56) References Cited

U.S. PATENT DOCUMENTS 4,885,513 A * 12/1989 Sakamoto .............. B60N 2/449
297/284.9
4,924,162 A * 5/1990 Sakamoto .............. B60N 2/449
297/284.9
(Continued)

FOREIGN PATENT DOCUMENTS

JP 58-76334 A 5/1983
JP 4-2530 A 1/1992
(Continued)

OTHER PUBLICATIONS

International Search Report issued Jun. 17, 2014, in PCT/JP2014/001695 filed Mar. 25, 2014.
(Continued)

*Primary Examiner* — Rodney B White
(74) *Attorney, Agent, or Firm* — Oblon, McClelland, Maier & Neustadt, L.L.P.

(57) ABSTRACT

A vehicle seat is capable of being shifted to a walk-in state without side support parts or a tilt part hindering the seat back from folding forward. A seat includes a seat cushion, a seat back, and a leg rest part. The seat is provided with side support parts at left and right sides of an occupant, and a tilt part that moves a front portion of the seat cushion upward and downward. The seat is further provided with a detecting part that detects a state of the seat back, and a control unit that causes at least one of the side support parts and the tilt
(Continued)

part to transit from a deployed state to a housed state when the detecting part detects that a forward turn of the seat back is started.

6 Claims, 5 Drawing Sheets

(51) Int. Cl.
| | |
|---|---|
| *A47C 7/14* | (2006.01) |
| *B60N 2/02* | (2006.01) |
| *B60N 2/44* | (2006.01) |
| *B60N 2/06* | (2006.01) |
| *B60N 2/12* | (2006.01) |

(52) U.S. Cl.
CPC ............... *B60N 2/06* (2013.01); *B60N 2/12* (2013.01); *B60N 2/20* (2013.01); *B60N 2/4492* (2015.04); *B60N 2/4495* (2013.01)

(58) Field of Classification Search
USPC ... 297/216.1, 216.13, 216.14, 216.15, 284.9, 297/361.1, 362, 362.11, 362.12, 362.13, 297/362.14
See application file for complete search history.

(56) References Cited

U.S. PATENT DOCUMENTS

| | | | | | |
|---|---|---|---|---|---|
| 4,924,163 | A * | 5/1990 | Sakamoto | ............ | B60N 2/0224 297/284.9 |
| 5,074,583 | A * | 12/1991 | Fujita | .................... | B60R 21/205 180/271 |
| 5,127,708 | A * | 7/1992 | Kishi | ....................... | A61B 5/18 297/284.9 X |
| 5,129,704 | A * | 7/1992 | Kishi | ................... | B60N 2/0224 297/284.9 X |
| 5,263,765 | A * | 11/1993 | Nagashima | ............ | A47C 7/467 297/284.9 X |
| 5,320,409 | A * | 6/1994 | Katoh | .................. | B60N 2/0232 297/284.9 X |
| 5,707,109 | A * | 1/1998 | Massara | ............... | B60N 2/4415 297/284.9 |
| 5,975,633 | A * | 11/1999 | Walk | .................. | B60N 2/42727 297/284.9 X |
| 6,220,667 | B1 * | 4/2001 | Wagner | .................. | B60N 2/002 297/284.9 X |
| 7,152,922 | B2 * | 12/2006 | Garland | ............. | B60N 2/01583 297/362.11 X |
| 7,322,652 | B1 * | 1/2008 | Tache | .................. | B60N 2/0224 297/284.9 |
| 7,628,453 | B2 * | 12/2009 | Herkenrath | .......... | B60N 2/0252 297/284.9 X |
| 7,822,523 | B2 * | 10/2010 | Yoshida | ............... | B60N 2/0232 297/284.9 |
| 7,856,300 | B2 * | 12/2010 | Hozumi | ............... | B60N 2/0244 297/284.9 |
| 7,917,264 | B2 * | 3/2011 | Hozumi | ............... | B60N 2/0244 297/284.9 |
| 8,032,284 | B2 * | 10/2011 | Hozumi | ............... | B60N 2/0248 297/284.9 X |
| 8,036,796 | B2 * | 10/2011 | Hozumi | ............... | B60N 2/0244 297/284.9 |
| 8,123,296 | B2 * | 2/2012 | Rager | .................. | B60N 2/4415 297/284.9 X |
| 8,388,067 | B2 * | 3/2013 | Hida | .................... | B60N 2/0232 297/362 |
| 8,393,667 | B2 * | 3/2013 | Hashimoto | .......... | B60N 2/0276 297/216.14 X |
| 8,511,750 | B2 * | 8/2013 | Moriyama | ........... | B60N 2/0232 297/362.11 |
| 8,775,018 | B2 * | 7/2014 | Uenuma | .............. | B60N 2/0232 297/284.9 |
| 8,820,830 | B2 * | 9/2014 | Lich | ..................... | B60N 2/0276 297/284.9 X |
| 8,998,320 | B2 * | 4/2015 | Mankame | .............. | B60N 2/002 297/361.1 X |
| 2007/0063567 | A1 * | 3/2007 | Nakaya | ................ | B60N 2/0232 297/362.11 |
| 2007/0120407 | A1 | 5/2007 | Kojima | | |
| 2007/0200408 | A1 * | 8/2007 | Ohta | .................... | B60N 2/0232 297/362.11 |
| 2007/0228713 | A1 * | 10/2007 | Takemura | ............... | B60R 22/46 297/284.9 X |
| 2008/0136237 | A1 * | 6/2008 | Kayumi | ............... | B60N 2/4492 297/284.9 |
| 2009/0218858 | A1 * | 9/2009 | Lawall | ................. | B60N 2/4235 297/284.9 X |
| 2010/0090448 | A1 * | 4/2010 | Pursche | .............. | B60R 21/0134 297/284.9 X |
| 2010/0117412 | A1 * | 5/2010 | Bicker | ................... | B60N 2/002 297/284.9 X |
| 2011/0291448 | A1 * | 12/2011 | Hashimoto | .......... | B60N 2/0276 297/216.14 |
| 2015/0202993 | A1 * | 7/2015 | Mankame | ............. | B60N 2/002 297/284.9 X |

FOREIGN PATENT DOCUMENTS

| | | | |
|---|---|---|---|
| JP | 04038231 A | * | 2/1992 |
| JP | 06-23821 U | | 3/1994 |
| JP | 6-328973 A | | 11/1994 |
| JP | 7-111927 A | | 5/1995 |
| JP | 2001-1814 A | | 1/2001 |
| JP | 2006-347514 A | | 12/2006 |
| JP | 2008-264291 A | | 11/2008 |
| JP | 2011-230769 A | | 11/2011 |

OTHER PUBLICATIONS

Toyota Soarer, "New Model Car Manual", 2 pages, (May 7, 1991), with a partial English translation.
Toyota Alphard, "New Model Car Manual", 3 pages, (Aug. 5, 2008), with a partial English translation.
Japanese Office Action issued Dec. 8, 2016 in patent application No. 2013-193944 with unedited computer generated English translation.
International Preliminary Report on Patentability and Written Opinion dated Mar. 31, 2016 in PCT/JP2014/001695 (with English translation).

* cited by examiner

VEHICLE SEAT

TECHNICAL FIELD

The present invention relates to a vehicle seat, and more particularly relates to a vehicle seat that is capable of easily shifting to a walk-in state.

BACKGROUND ART

PTL 1 discloses a seat in which in order to allow an occupant to easily get on/off a vehicle, a seat back of the seat positioned in the vicinity of a door is folded forward and a forward slide of the seat expands a space behind the seat. The seat described in Patent Document 1 is configured to unlock, when the seat back is folded forward beyond a predetermined angle, a slide lock of the seat, and to slide forward. In the present description, a state where a seat back is sufficiently folded forward is called a forward folding state, and a state where the seat in the forward folding state is then slid forward is called a walk-in state.

Moreover, PTL 2 discloses, in order to improve a ride quality of an occupant, providing side support parts for supporting the occupant from left and right sides, to a seat cushion and a seat back. Such a configuration can restrict the occupant being shifted in the transverse direction when a vehicle goes around a curve.

CITATION LIST

Patent Document

PTL 1: Japanese Patent Application Laid-Open No. 2011-230769
PTL 2: Japanese Patent Application Laid-Open No. H07-111927

SUMMARY OF INVENTION

If the side support parts described in PTL 2 are provided to a seat cushion and a seat back in the seat described in PTL 1, the side support parts might obstruct the seat back being sufficiently folded forward, and the seat might not start sliding forward in some cases. In other words, providing the side support parts to the seat may hinder the seat from shifting to the walk-in state. In particular, providing larger side support parts for improving the supportability of the occupant is likely to hinder the seat from shifting to the walk-in state. Similarly, providing a tilt part that moves a front portion of a seat cushion upward and downward may hinder the seat from shifting to the walk-in state because the seat cushion moved upward obstructs the seat back being sufficiently folded forward.

The present invention is made to solve the abovementioned problem, and aims to provide a vehicle seat including side support parts or a tilt part, and capable of shifting to a walk-in state without the side support parts or the tilt part hindering the seat back from folding forward.

An aspect of the present invention is a vehicle seat comprising: a seat cushion that is slidable with respect to a vehicle in a front and rear direction of the vehicle, and includes a seat surface on which an occupant is seated; a seat back that is turnable in the front and rear direction, and includes a back surface with which a back of the occupant is supported; a detecting part that detects a turning state of the seat back; at least one of a side support part and a tilt part, the side support part being provided to at least one of the seat cushion and the seat back and being switchable between a deployed state in which the side support part protrudes to a region between the seat surface and the back surface and a housed state in which the degree of the protrusion to the region is smaller than that in the deployed state, the tilt part being configured to allow a front portion of the seat cushion to move upward and downward, and being switchable between a deployed state where the front portion is moved upward and a housed state where the front portion is moved downward; and a control unit that causes at least one of the side support part and the tilt part to transit from the deployed state to the housed state when the detecting part detects that a forward turn of the seat back is started.

According to the present invention, when the start of the forward turn of the seat back is detected, the side support parts or the tilt part transits to the housed state, so that the side support parts or the tilt part does not hinder the seat back from being in the forward folding state. This allows the seat to be stably shifted to the walk-in state after the forward folding state is detected.

DESCRIPTION OF EMBODIMENTS

Hereinafter, an embodiment of the present invention will be explained with reference to the drawings; however, the present invention is not limited to the present embodiment. Note that, elements having the same function are assigned with the same reference numerals in the drawings explained below, and repeated explanations thereof are omitted in some cases. The front and rear direction, the left and right direction, and the up and down direction that are used in the present description and the drawings respectively indicate directions in a state where a seat according to the present embodiment is mounted to a vehicle.

Figure 1:
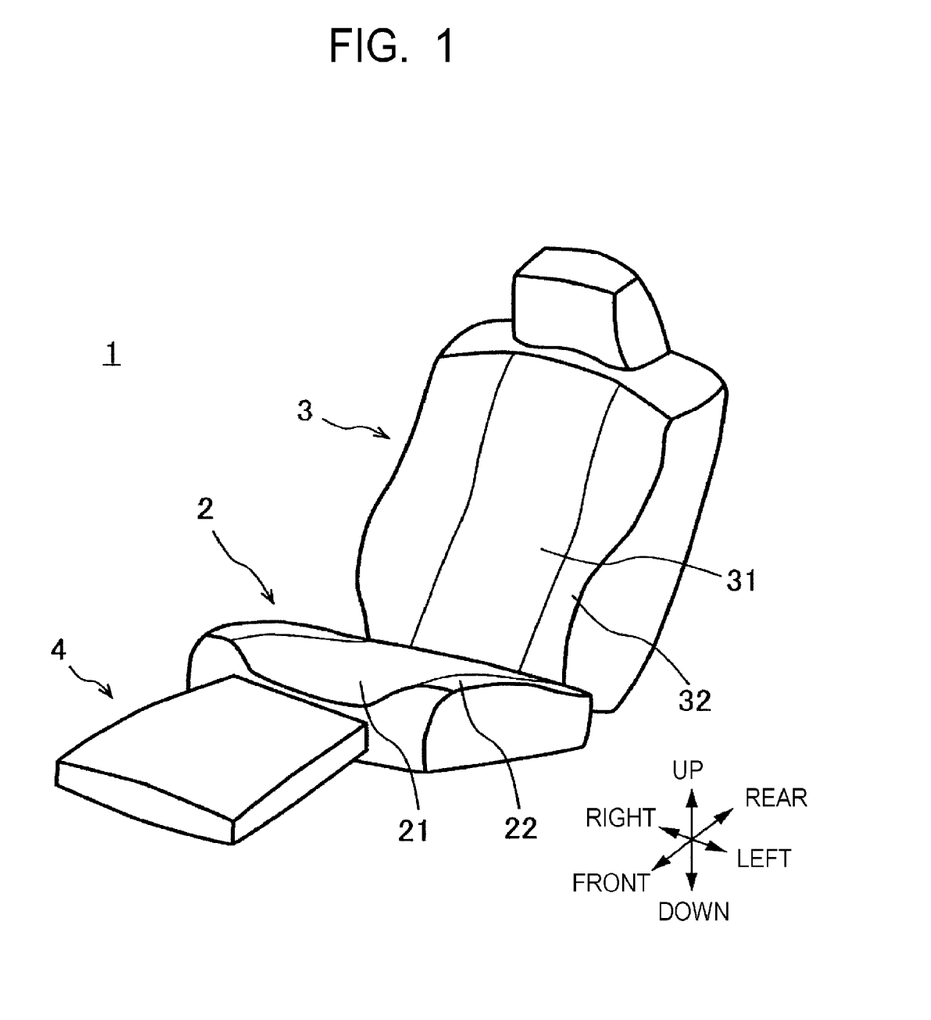
FIG. 1 is a perspective view of a seat according to an embodiment of the present invention.

FIG. 1 is a perspective view of a seat 1 according to the present embodiment. The seat 1 includes a seat cushion 2, a seat back 3, and a leg rest part 4 (which is also called an ottoman). The seat cushion 2 includes a seat surface 21 on which an occupant is seated, and cushion side support parts 22 that are positioned at left and right sides of the occupant. The cushion side support parts 22 are in a state (which is called a deployed state) where the cushion side support parts 22 extend upward from the seat surface 21 so as to support the occupant when the occupant is seated on the seat 1. In the deployed state, the cushion side support parts 22 protrude from the seat surface 21 towards the occupant (or a back surface 31 of the seat back 3).

Meanwhile, the cushion side support parts 22 are in a state (which is called a housed state) where the cushion side support parts 22 do not extend upward from the seat surface 21 so as not to hinder the seat back 3 from folding forward when the seat 1 is shifted to a walk-in state. A control device 5, which is described later, causes the cushion side support parts 22 to transit from the deployed state to the housed state when the seat 1 is shifted to the walk-in state, and causes the cushion side support parts 22 to transit from the housed state to the deployed state when the seat 1 is returned from the walk-in state.

The seat back 3 includes the back surface 31 that supports the back of the occupant, and seat back side support parts 32 that are positioned at left and right sides of the occupant. The seat back side support parts 32 are in a state (which is called a deployed state) where the seat back side support parts 32 extend forward from the back surface 31 so as to support the occupant from the left and right direction when the occupant is seated on the seat 1. In the deployed state, the seat back side support parts 32 protrude from the back surface 31 towards the occupant (or the seat surface 21 of the seat cushion 2).

Meanwhile, the seat back side support parts 32 are in a state (which is called a housed state) where the seat back side support parts 32 do not extend forward from the back surface 31 so as not to hinder the seat back 3 from folding forward when the seat 1 is shifted to the walk-in state. The control device 5, which is described later, causes the seat back side support parts 32 to transit from the deployed state to the housed state when the seat 1 is shifted to the walk-in state, and causes the seat back side support parts 32 to transit from the housed state to the deployed state when the seat 1 is returned from the walk-in state.

In other words, the deployed state of the side support parts 22 and 32 is a state where the side support parts 22 and 32 protrude to a region between the seat surface 21 of the seat cushion 2 and the back surface 31 of the seat back 3 (in other words, a region where a body of the occupant is positioned when the occupant is seated). Moreover, the housed state of the side support parts 22 and 32 is a state where the side support parts 22 and 32 do not protrude to the region, or protrude by an extent smaller than that in the deployed state. In other words, the extent that the side support parts 22 and 32 protrude in the housed state may be smaller than that in the deployed state so as not to hinder the seat back 3 from folding forward.

The side support parts 22 and 32 are electrically or pneumatically switched between the deployed state and the housed state, for example. The side support parts 22 and are configured to be turnable in the left and right direction when electrically switched, and the side support parts 22 and 32 are caused to turn in the left or right direction by a driving mechanism such as a motor, and may be switched between a state of protruding towards the occupant and a state of not protruding. The side support parts 22 and 32 are configured to be switched between an inflated state like a balloon and a deflated state by the air when pneumatically switched, and the side support parts and 32 take in and take out the air using an air compressor or the like, and may be switched between the state of protruding towards the occupant and the state of not protruding.

Figure 2:
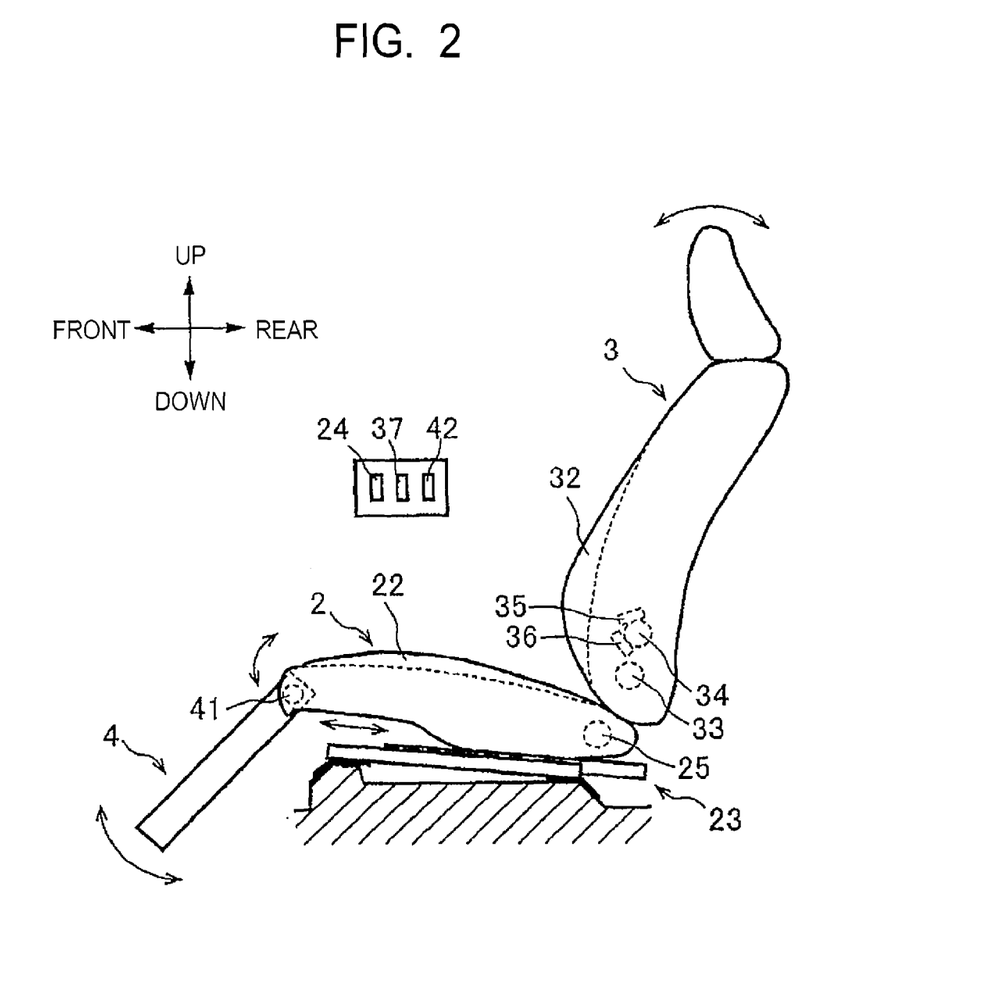
FIG. 2 is a side view of the seat according to an embodiment of the present invention.

FIG. 2 is a side view of the seat 1 according to the present embodiment. The seat cushion 2 is fixed onto a slide mechanism 23 that is provided on a vehicle floor. The slide mechanism 23 includes a driving part (such as a motor), and a sensor (a rotation number sensor of the motor or the like) for detecting a driving state, and slides the seat cushion 2 in the front-rear direction by a predetermined amount to slide the entire seat 1 in the front-rear direction. In addition, the seat cushion 2 includes a tilt part 25 with which the occupant adjusts an inclination of the seat cushion 2 to a desired inclination by causing a front portion of the seat cushion 2 to move upward or downward. The vehicle includes a seat cushion operating part 24 for controlling driving of the slide mechanism 23 and the tilt part 25. In response to an operation of the seat cushion operating part 24 by the occupant, the slide mechanism 23 causes the seat cushion 2 to slide forward or rearward, or stop. Moreover, in response to an operation of the seat cushion operating part by the occupant, the tilt part 25 causes the front portion of the seat cushion 2 to move upward or downward. A state where the tilt part 25 has caused the front portion of the seat cushion 2 to move upward is called a deployed state, and a state where the tilt part 25 has caused the front portion of the seat cushion 2 to move downward is called a housed state. As for the seat cushion operating part 24, an arbitrary operating part such as a switch or a lever can be used.

The seat cushion 2 is automatically slid by the slide mechanism 23 using the driving part such as the motor in the present embodiment, but alternatively the seat cushion 2 may be manually slid using a force of the occupant. In that case, the slide mechanism 23 performs switching between a lock state where the seat cushion 2 is non-slidable and an unlock state where the seat cushion 2 is slidable, in response to the operation of the seat cushion operating part 24 by the occupant. When the slide mechanism 23 is in the unlock state, the occupant can manually slide the seat cushion 2 in the front-rear direction.

The leg rest part 4 is provided on a front end of the seat cushion 2. The leg rest part 4 includes a leg rest part driving mechanism 41, and the leg rest part driving mechanism 41 includes a driving part (such as a motor) and a sensor (a rotation number sensor of the motor or the like) for detecting a driving state, and causes the leg rest part 4 to turn by a predetermined amount about an axis in the left and right direction of the leg rest part 4. The vehicle is provided with a leg rest part operating part for controlling driving of the leg rest part driving mechanism 41. In response to an operation of the leg rest part operating part 42 by the occupant, the leg rest part driving mechanism 41 causes the leg rest part 4 to turn forward or rearward, or stop. As for the leg rest part operating part 42, an arbitrary operating part such as a switch or a lever can be used. When the seat 1 is shifted to the walk-in state, the control device 5, which is described later, controls the leg rest part driving mechanism 41 to cause the leg rest part 4 to transit to a state of being turned rearward (which is called a housed state). The housed state is a state where the leg rest part 4 is turned rearward to such an extent as not hindering the seat 1 from sliding forward for shifting to the walk-in state. Moreover, when the seat 1 is returned from the walk-in state, the control device 5, which is described later, controls the leg rest part driving mechanism 41 to cause the leg rest part 4 to transit to a state of being turned forward (which is called a deployed state).

The leg rest part 4 may be configured to be capable of being housed in a portion under the seat 1 or another portion, and be taken out and disposed only when necessary so as to be disposed on the front end of the seat cushion 2.

The seat back 3 is provided on a rear end of the seat cushion 2. The seat back 3 includes a power recliner mechanism 33 with which the occupant adjusts the seat back 3 to a desired angle, and a forward folding mechanism 34 for causing the seat back 3 to turn forward or rearward when the seat 1 is shifted to the walk-in state or when the seat 1 is returned from the walk-in state. The power recliner mechanism 33 includes a driving part (a motor, an actuator, or the like), and a sensor (a rotation number sensor of the motor or the like) for detecting a driving state, and causes the seat back 3 to turn by a predetermined amount about an axis in the left and right direction of the seat back 3. The vehicle is provided with a seat back operating part 37 for controlling driving of the power recliner mechanism 33. In response to an operation of the seat back operating part 37 by the occupant, the power recliner mechanism 33 causes the seat back 3 to turn forward or rearward, or stop. As for the seat back operating part 37, an arbitrary operating part such as a switch or a lever can be used.

The forward folding mechanism 34 causes the seat back 3 to turn about an axis in the left and right direction of the seat back 3 using the force of the occupant. When the occupant shifts the seat 1 to the walk-in state, the occupant applies a forward force to the seat back 3, thereby allowing the forward folding mechanism 34 to cause the seat back 3 to turn forward. A state where the seat back 3 is turned forward to allow the seat 1 to shift to the walk-in state is called a forward folding state. When the occupant returns the seat 1 from the walk-in state, the occupant applies a rearward force to the seat back 3, thereby allowing the forward folding mechanism 34 to cause the seat back 3 to turn rearward. A state where the seat back 3 is turned rearward to allow the occupant to be seated is called a normal state.

The forward folding mechanism 34 includes a first limit switch 35 serving as a first detecting part for detecting the start of forward folding of the seat back 3, and a second limit switch 36 serving as a second detecting part for detecting the completion of forward folding of the seat back 3. The first limit switch 35 is provided to the forward folding mechanism 34 so as to be in an ON state before the start of the forward folding, and to turn to an OFF state at the start of the forward folding. Meanwhile, the second limit switch 36 is provided to the forward folding mechanism 34 so as to be in an OFF state before the completion of the forward folding, and to turn to an ON state at the completion of the forward folding. Here, the start of the forward folding indicates that the seat back 3 has started turning forward by receiving the forward force. Moreover, the completion of the forward folding indicates that the seat back 3 has turned forward to sufficiently come close to the seat cushion 2. The control device 5, which is described later, controls the side support parts 22, 32, the slide mechanism 23, and the leg rest part driving mechanism 41 based on the states of the first limit switch 35 and the second limit switch 36. Note that the ON/OFF states of the first limit switch 35 and the second limit switch 36 are defined for convenience, and the ON/OFF states therefore may be opposite to those above.

The first limit switch (first detecting part) 35 and the second limit switch (second detecting part) 36 are switches that are in a state of either one of ON and OFF in the present embodiment, but are not limited to these, and may be any detecting parts that can detect a state of the seat back 3. For example, a rotation number sensor is provided to an axis of the forward folding mechanism 34 as the first detecting part 35 and the second detecting part 36, and the start and the completion of forward folding may be detected from the detected rotation number. Moreover, a hall IC may be provided as the first detecting part 35 and the second detecting part 36, and the start and the completion of forward folding may be detected from a change in the magnetic field.

In the present embodiment, the seat back 3 is manually turned with the forward folding mechanism 34 using the force of the occupant, however, may be automatically turned using a driving part such as a motor. In that case, an operating part for instructing the switching to the walk-in state is provided to the vehicle, and the forward folding mechanism 34 causes the seat back 3 to turn forward or rearward by a predetermined amount using the driving part in response to an operation of the operating part by the occupant. In that case, the power recliner mechanism 33 may also function as the forward folding mechanism 34.

Figure 3:
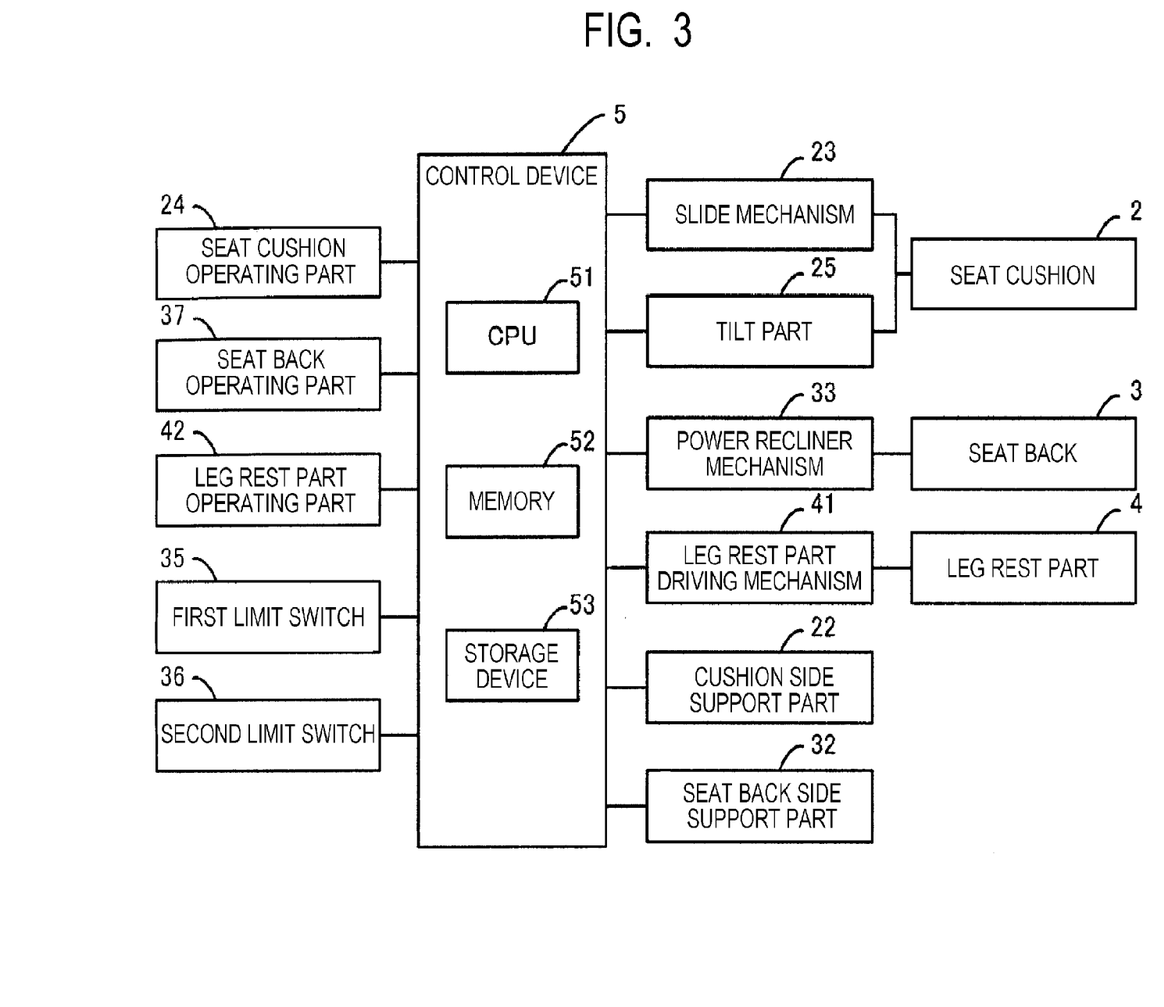
FIG. 3 is a block diagram of a control device according to an embodiment of the present invention.

FIG. 3 is a schematic configuration diagram of the control device 5 serving as a control unit that controls the seat 1 according to the present embodiment. The control device 5 is provided to the vehicle, and controls the parts of the seat 1. The control device 5 includes a CPU 51, a memory 52, and a storage device 53, and is connected to each part of the seat 1 via wires and gives and receives signals thereto and therefrom. As for the control device 5, any computer, such as a micro computer or an embedded system, which can be used in the vehicle, may be used.

The storage device 53 stores a program for controlling the parts of the seat 1, data used for the control, and the like. The storage device 53 is a computer readable storage medium, which includes a read-only ROM, a hard disk drive capable of reading and writing, and the like. Moreover, the storage device 53 may include a portable storage medium such as a CD-ROM, a flash memory, or the like.

The CPU 51 stores a signal received from each part of the seat 1 in the memory 52 as temporary data, reads out a program (for example, a control program illustrated in FIG. 4 and FIG. 5, which is described later) that is stored in the storage device 53, and executes various process operations, such as computation, control, and determination, for the temporary data in accordance with the program. In addition, the CPU 51 sends control signals to the parts of the seat 1 in accordance with the processes.

Figure 4:
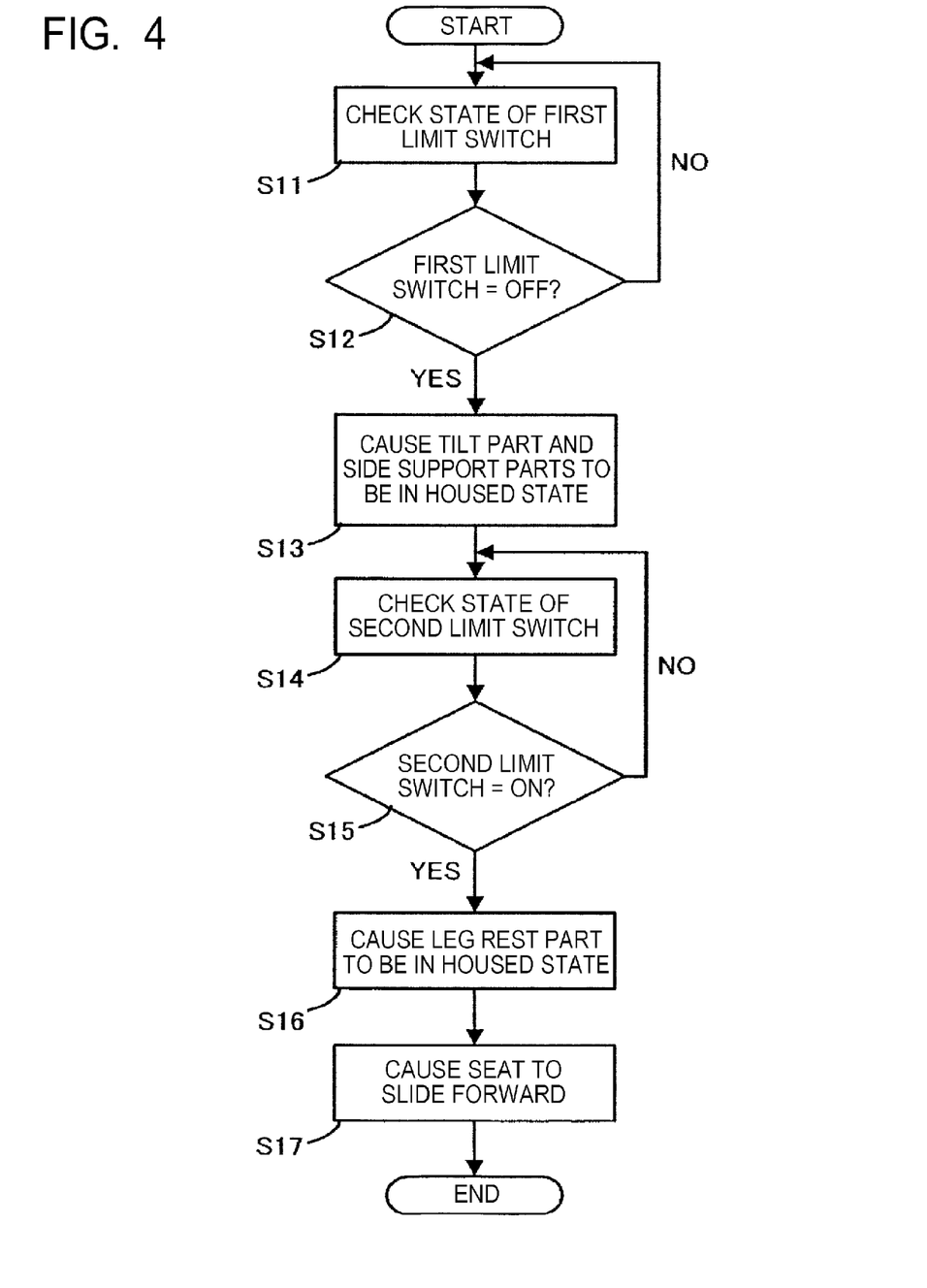
FIG. 4 is a view illustrating a flowchart of a controlling method of the seat according to an embodiment of the present invention.

FIG. 4 is a view illustrating a flowchart of a program that allows the seat 1 to be shifted to a walk-in state. Firstly, an occupant applies a forward force to the seat back 3 to cause the seat back 3 to start a forward turn. After that, the occupant continues to turn the seat back 3 forward.

When the forward turn of the seat back 3 is started, the control device 5 reads out a program in FIG. 4 from the storage device 53, and starts a shift process to the walk-in state. The control device 5 checks a state of the first limit switch 35 (Step S11). If the first limit switch 35 is in an ON state at Step S11 (in other words, if the forward folding is not started), the control device 5 repeats the check of the state of the first limit switch 35 (Step S12).

If the first limit switch 35 is in an OFF state at Step S11 (in other words, if the forward folding is started), the control device 5 causes the tilt part 25, the cushion side support parts 22, and the seat back side support parts 32 to be in a housed state (Step S13). Specifically, the control device 5 sends control signals to the tilt part 25, the cushion side support parts 22, and the seat back side support parts 32, and the tilt part 25, the cushion side support parts 22, and the seat back side support parts 32 transit to the housed state in accordance with the control signals. All of the tilt part 25 and the side support parts 22, 32 are not necessarily caused to transit to the housed state, but at least one of the tilt part 25 and the side support parts 22, 32 only needs to be caused to transit to the housed state so as not to hinder the seat back 3 from turning forward.

In the present embodiment, when the first limit switch 35 turns to an OFF state, the control device 5 detects that the forward turn of the seat back 3 is started. The first limit switch 35 does not need to turn to an OFF state simultaneously with the start of the forward turn of the seat back 3. Setting a predetermined time difference between the time when the forward turn of the seat back 3 is started and the time when the first limit switch 35 turns to an OFF state may prevent the seat 1 from unintendedly shifting to the walk-in state in a case where the occupant presses the seat back 3 forward by mistake, or other cases.

Next, the control device 5 checks a state of the second limit switch 36 (Step S14). If the second limit switch 36 is in an OFF state at Step S14 (in other words, if the forward folding is not completed), the control device 5 repeats the check of the state of the second limit switch 36 (Step S15).

If the second limit switch 36 is in an ON state at Step S14 (in other words, if the forward folding is completed), the control device 5 causes the leg rest part 4 to be in the housed state (Step S16). Specifically, the control device 5 sends a control signal to the leg rest part driving mechanism 41, and the leg rest part driving mechanism 41 causes the leg rest part 4 to be in the housed state in accordance with the control signal. In this manner, by the second limit switch 36 turning to an ON state, the control device 5 can detect that the seat back 3 is in a forward folding state. In this process, the occupant recognizes that the seat back 3 is in the forward folding state, and ends the forward turn of the seat back 3. If the power recliner mechanism 33 is used to cause the seat back 3 to turn forward, the control device 5 may cause the power recliner mechanism 33 to stop the turn of the seat back 3 at Step S16.

After the leg rest part 4 is housed at Step S16, the control device 5 causes the seat 1 to slide forward (Step S17). Specifically, the control device 5 sends a control signal to the slide mechanism 23, and the slide mechanism 23 causes the seat 1 to slide forward in accordance with the control signal. After the forward slide movement is completed, the shift to the walk-in state of the seat 1 is completed. Note that, the processings at Step S16 and at Step S17 may be performed concurrently.

Meanwhile, when the slide of the seat 1 is manually performed by an occupant, the control device 5 may cause the slide mechanism 23 to unlock the lock state at Step S17, and the occupant may slide the seat 1 forward. When the forward slide movement of the seat 1 is completed, the control device 5 causes the slide mechanism 23 to set the lock state.

As a modification example according to the embodiment, after the control device 5 detects that the forward turn of the seat back 3 is started (after Step S12) without waiting that the forward turn of the seat back 3 is completed, the control device 5 may execute the housing of the leg rest part 4 and the start of the slide of the seat 1. In that case, the control device 5 may execute the housing of the leg rest part 4 (Step S16) and the start of the slide of the seat 1 (Step S17) concurrently with the shifting of the tilt part 25 and the side support parts 22, 32 to the housed state (Step S13). Such a configuration enables a time required to shift to the walk-in state to be shortened.

As a modification example according to the embodiment, the seat back 3 may turn forward by the power recliner mechanism 33 including a driving part such as a motor or an actuator. In that case, the control device 5 may use an operation of the operating part such as a switch or a lever by the occupant as a trigger to cause the power recliner mechanism 33 to start the turn of the seat back 3, and continue the forward turn thereafter. In addition, in that case, the control device 5 preferably controls the turn of the seat back 3 so as to complete the forward folding of the seat back 3 after the transition to the housed state of the tilt part 25 and the side support parts 22, 32 is completed. Such a configuration enables the tilt part 25 and the side support parts 22, 32 not to hinder the forward turn of the seat back 3.

Note that, in a case, which is not indicated in the program in FIG. 4, where the seat back 3 is pulled back rearward in a halfway of the shift to the walk-in state, in other words, in a case where the first limit switch 35 is again in an ON state before the shift to the walk-in state is completed, the control device 5 controls the side support parts 22, 32, the leg rest part driving mechanism 41, and the slide mechanism 23 to perform a process to cause the seat 1 to be again in a seatable state.

Figure 5:
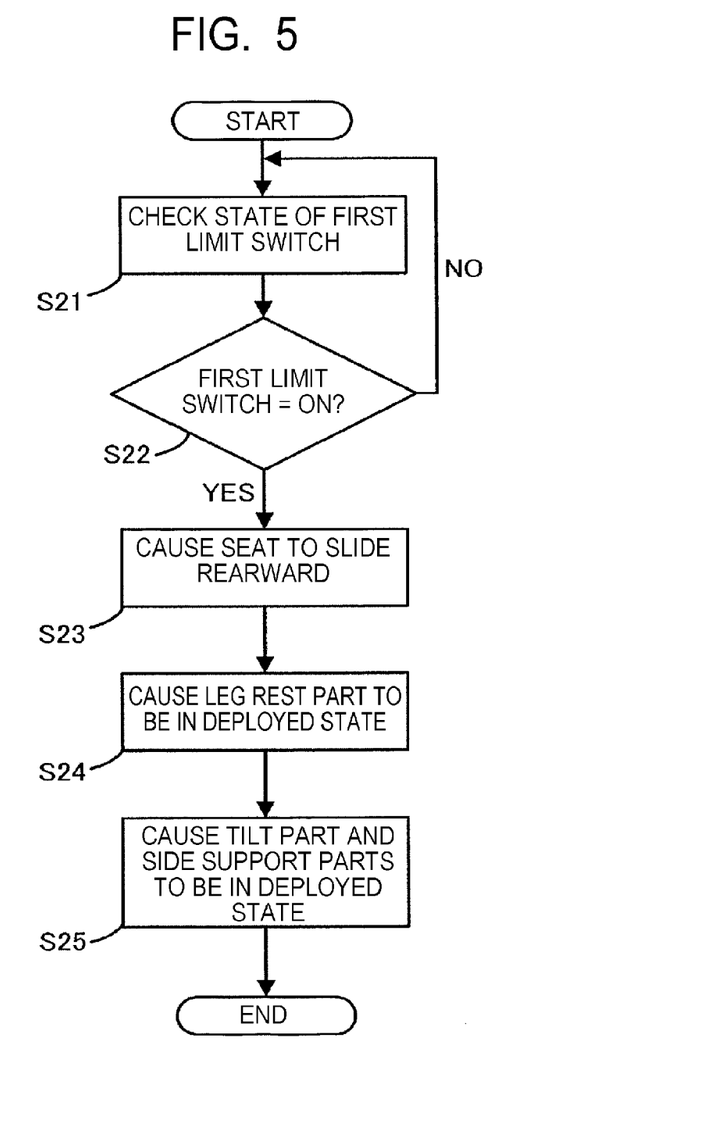
FIG. 5 is a view illustrating a flowchart of a controlling method of the seat according to an embodiment of the present invention.

FIG. 5 is a view illustrating a flowchart of a program that allows the seat 1 to be returned from the walk-in state. Firstly, an occupant applies a rearward force to the seat back 3 to cause the seat back 3 to start a rearward turn. After that, the occupant continues to turn the seat back 3 rearward.

Meanwhile, in a case where the rearward turn of the seat back 3 is performed by the power recliner mechanism 33 including a driving part such as a motor and an actuator, the control device 5 may use an operation of the operating part such as a switch or a lever by the occupant as a trigger to cause the power recliner mechanism 33 to start the turn of the seat back 3, and continue the rearward turn thereafter.

When the rearward turn of the seat back 3 is started, the control device 5 reads out the program in FIG. 5 from the storage device 53, and starts a return process from the walk-in state. The control device 5 checks a state of the first limit switch 35 (Step S21). If the first limit switch 35 is in an OFF state at Step S21 (in other words, if the rearward turn is not completed), the control device 5 repeats the check of the state of the first limit switch (Step S22).

If the first limit switch 35 is in an ON state at Step S21 (in other words, if the rearward turn is completed), the control device 5 causes the seat 1 to slide rearward (Step S23). Specifically, the control device 5 sends a control signal to the slide mechanism 23, and the slide mechanism 23 causes the seat 1 to slide rearward in accordance with the control signal. In this process, the occupant recognizes that the seat back 3 becomes in a normal state, and ends the rearward turn of the seat back 3. In this manner, by the first limit switch 35 turning to an ON state, the control device 5 can detect that the rearward turn of the seat back 3 is completed.

Meanwhile, when the slide of the seat 1 is manually performed by an occupant, the control device 5 may cause the slide mechanism 23 to unlock the lock state at Step S23, and the occupant may slide the seat 1 rearward. When the rearward slide movement of the seat 1 is completed, the control device 5 causes the slide mechanism 23 to set the lock state.

If the power recliner mechanism 33 is used to cause the seat back 3 to turn rearward, the control device 5 may cause the power recliner mechanism 33 to stop the turn of the seat back 3 at Step S23.

After the rearward slide movement of the seat 1 is completed at Step S23, the control device 5 causes the leg rest part 4 to be in the deployed state (Step S24). Specifically, the control device 5 sends a control signal to the leg rest part driving mechanism 41, and the leg rest part driving mechanism 41 causes the leg rest part 4 to be in the deployed state in accordance with the control signal.

After the leg rest part 4 is completed to be deployed at Step S24, the control device 5 causes the tilt part 25, the cushion side support parts 22, and the seat back side support parts 32 to be in the deployed state (Step S25). Specifically, the control device 5 sends control signals to the tilt part 25, the cushion side support parts 22, and the seat back side support parts 32, and the tilt part 25, the cushion side support parts 22, and the seat back side support parts 32 transit to the deployed state in accordance with the control signals. Note that, the processing from Step S23 to Step S25 may be performed concurrently.

When the tilt part 25, the cushion side support parts 22, and the seat back side support parts 32 are completed to be deployed, the return from the walk-in state is completed, and the seat 1 becomes in a seatable state.

With the seat 1 according to the present embodiment, the cushion side support parts 22 and the seat back side support parts 32 support an occupant from the left and right sides to allow a ride quality of the occupant to be improved. Moreover, the tilt part 25 can change the inclination of the seat cushion 2 as desired. Simultaneously with the above, the tilt part 25, the cushion side support parts 22, and the seat back side support parts 32 are in the housed state when the seat 1 is shifted to the walk-in state, which does not hinder the seat back 3 from being in the forward folding state. This allows a reliable detection of the seat back 3 being in the forward folding state and allows the seat 1 to be stably shifted to the walk-in state. Even if the cushion side support parts 22 and the seat back side support parts 32 are further enlarged for improvement in supportability, the seat 1 can be reliably shifted to the walk-in state. Moreover, the leg rest part 4 is in the housed state when the seat 1 is shifted to the walk-in state. This results in a large forward slide of the seat 1 and allows a larger space for the occupant for getting on/off to be secured.

A processing method that stores in a storage medium the programs (for example, programs for executing the processes illustrated in FIG. 4 and FIG. 5) for operating the aforementioned configuration to implement the function in the aforementioned embodiment, reads out the program stored in the storage medium as codes, and executes the codes on a computer is also included within the range of the abovementioned embodiment. In other words, a computer readable storage medium is also included within the range of the embodiment. Moreover, in addition to the storage medium in which the aforementioned computer programs are stored, the computer programs themselves are included within the range of the abovementioned embodiment included. As for the storage medium, for example, a floppy (registered trademark) disk, a hard disk, an optical disk, a magneto-optical disk, a CD-ROM, a magnetic tape, a non-volatile memory card, and an ROM can be used.

Furthermore, not only one that executes the processing by the single program stored in the aforementioned storage medium, but also one that operates on an OS while cooperating with another piece of software or the function of an extension board to execute the action of the aforementioned embodiment is also included within the range of the embodiment.

The present invention is not limited to the abovementioned embodiment, but can be changed as appropriate without deviating from the scope of the present invention.

This application claims the priority of the Japanese patent Application No. 2013-193944, filed on Sep. 19, 2013, which is hereby incorporated by reference as a part of this application.

The invention claimed is:

1. A vehicle seat comprising:
   a seat cushion that is slidable with respect to a vehicle in a front and rear direction of the vehicle, and includes a seat surface on which an occupant is seated;
   a seat back that is turnable in the front and rear direction, and includes a back surface with which a back of the occupant is supported;
   a detecting part that detects a turning state of the seat back;
   at least one of a side support part and a tilt part, the side support part being provided to at least one of the seat cushion and the seat back and being switchable between a deployed state in which the side support part protrudes to a region between the seat surface and the back surface and a housed state in which the degree of the protrusion to the region is smaller than that in the deployed state, the tilt part being configured to allow a front portion of the seat cushion to move upward and downward, and being switchable between a deployed state where the front portion is moved upward and a housed state where the front portion is moved downward; and
   a control unit that causes at least one of the side support part and the tilt part to transit from the deployed state to the housed state when the detecting part detects that a forward turn of the seat back is started,
   wherein the detecting part includes a first detecting part for detecting that the forward turn of the seat back is started, and a second detecting part for detecting that the forward turn of the seat back is completed,
   the first detecting part is a first limit switch and the second detecting part is a second limit switch, and
   the first limit switch switches between ON and OFF states near a start of the forward turn of the seat back, and the second limit switch switches between ON and OFF states near a completion of the forward turn of the seat back.

2. The vehicle seat according to claim 1, wherein the control unit causes the seat cushion to slide forward when the detecting part detects that the forward turn of the seat back is completed or the forward turn of the seat back is started.

3. The vehicle seat according to claim 1, further comprising a recliner mechanism, the recliner mechanism including an operating part that is operable by an occupant, a driving part that turns the seat back, and an actuation control unit that controls an actuation of the operating part based on an operation of the operating part, wherein
   the actuation control unit controls the operation of the driving part such that the forward turn of the seat back is completed after the housing operation of the side support part or the tilt part is completed.

4. The vehicle seat according to claim 1, wherein the first detecting part switches to one of the ON and OFF states after a predetermined time elapsed from a time when the forward turn of the seat back is started.

5. A vehicle seat comprising:
   a seat cushion that is slidable with respect to a vehicle in a front and rear direction of the vehicle, and includes a seat surface on which an occupant is seated;
   a seat back that is turnable in the front and rear direction, and includes a back surface with which a back of the occupant is supported;
   a detecting part that detects a turning state of the seat back;
   at least one of a side support part and a tilt part, the side support part being provided to at least one of the seat cushion and the seat back and being switchable between a deployed state in which the side support part protrudes to a region between the seat surface and the back surface and a housed state in which the degree of the protrusion to the region is smaller than that in the deployed state, the tilt part being configured to allow a front portion of the seat cushion to move upward and downward, and being switchable between a deployed state where the front portion is moved upward and a housed state where the front portion is moved downward; and a control unit that causes at least one of the side support part and the tilt part to transit from the deployed state to the housed state when the detecting part detects that a forward turn of the seat back is started, wherein the detecting part includes a first detecting part for detecting that the forward turn of the seat back is started, and a second detecting part for detecting that the forward turn of the seat back is completed, and the first detecting part switches to an OFF state after a predetermined time elapsed from a time when the forward turn of the seat back is started.

6. A vehicle seat comprising:

a seat cushion that is slidable with respect to a vehicle in a front and rear direction of the vehicle, and includes a seat surface on which an occupant is seated;

a seat back that is turnable in the front and rear direction, and includes a back surface with which a back of the occupant is supported;

a detecting part that detects a turning state of the seat back;

at least one of a side support part and a tilt part, the side support part being provided to at least one of the seat cushion and the seat back and being switchable between a deplored state in which the side support part protrudes to a region between the seat surface and the back surface and a housed state in which the degree of the protrusion to the region is smaller than that in the deployed state, the tilt part being configured to allow a front portion of the seat cushion to move upward and downward, and being switchable between a deployed state where the front portion is moved upward and a housed state where the front portion is moved downward; and a control unit that causes at least one of the side support part and the tilt part to transit from the deployed state to the housed state when the detecting part detects that a forward turn of the seat back is started, wherein the detecting part includes a first detecting part for detecting that the forward turn of the seat back is started, and a second detecting part for detecting that the forward turn of the seat back is completed, and the seat back has a forward folding mechanism that turns the seat back in the front and rear direction when the seat back transmits to or from the housed state, and the forward folding mechanism has a rotation number sensor as the first and second detecting parts provided to an axis of the forward folding mechanism, the rotation number sensor detecting a start and a completion of the forward turn of the seat back on a basis of a detected rotation number.

* * * * *